United States Patent
Oh et al.

(10) Patent No.: US 11,332,150 B2
(45) Date of Patent: May 17, 2022

(54) SYSTEM AND METHOD FOR CONTROLLING WHEEL SLIP OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 16/701,694

(22) Filed: Dec. 3, 2019

(65) Prior Publication Data

US 2021/0031785 A1 Feb. 4, 2021

(30) Foreign Application Priority Data

Jul. 30, 2019 (KR) .................. 10-2019-0092528

(51) Int. Cl.
*B60W 40/101* (2012.01)
*F16H 48/30* (2012.01)
*B60W 50/10* (2012.01)
*B60W 50/00* (2006.01)

(52) U.S. Cl.
CPC .......... *B60W 40/101* (2013.01); *B60W 50/10* (2013.01); *F16H 48/30* (2013.01); *B60W 2050/0075* (2013.01); *B60W 2520/26* (2013.01); *B60W 2520/28* (2013.01); *B60W 2556/10* (2020.02)

(58) Field of Classification Search
CPC combination set(s) only.
See application file for complete search history.

(56) References Cited

U.S. PATENT DOCUMENTS

| | | | |
|---|---|---|---|
| 5,758,014 A * | 5/1998 | Young | B60L 3/10 388/815 |
| 10,207,713 B1 * | 2/2019 | Davis | F16H 59/40 |
| 2004/0059493 A1 * | 3/2004 | Nagura | B60K 28/165 701/89 |
| 2004/0168846 A1 * | 9/2004 | Maekawa | B60K 23/0808 180/248 |
| 2010/0161194 A1 * | 6/2010 | Turski | B60T 8/175 701/87 |
| 2019/0232774 A1 * | 8/2019 | Zedan | B60K 6/10 |
| 2020/0164745 A1 * | 5/2020 | Mohan | G05B 13/048 |
| 2020/0198475 A1 * | 6/2020 | Kaneko | B60L 3/106 |
| 2021/0188296 A1 * | 6/2021 | Ma | B60W 30/143 |

* cited by examiner

*Primary Examiner* — Jeff A Burke
*Assistant Examiner* — Madison B Emmett
(74) *Attorney, Agent, or Firm* — Mintz Levin Cohn Ferris Glovsky and Popeo, P.C.; Peter F. Corless (57) ABSTRACT

A method and system for controlling a wheel slip of a vehicle without using a reference speed is provided. The system includes a speed detector that detects a speed of a driving device for operating the vehicle and a controller that determines a torque calibration command based on a torque command of the driving device, and a current speed and a past speed of the driving device detected by the speed detector. The torque command of the driving device is calibrated using the determined torque calibration command, and a driving device is operated based on the calibrated torque command.

19 Claims, 7 Drawing Sheets

SYSTEM AND METHOD FOR CONTROLLING WHEEL SLIP OF VEHICLE

CROSS-REFERENCE TO RELATED APPLICATION

This application claims under 35 U.S.C. § 119(a) the benefit of priority to Korean Patent Application No. 10-2019-0092528 filed on Jul. 30, 2019, the entire contents of which are incorporated herein by reference.

BACKGROUND

(a) Technical Field

The present disclosure relates to a system and a method for controlling a wheel slip of a vehicle, and more particularly, to a system and a method for controlling a wheel slip of a vehicle, which may control a wheel slip of a vehicle wheel without using a reference speed in a vehicle, and achieve improved control responsiveness.

(b) Background Art

In general, as an electronic control system for improving safety during operation of a vehicle, known are an Anti-lock Brake System (ABS) that prevents brake lock due to a wheel slip on a slippery road surface when decelerating the vehicle, a Traction Control System (TCS) that adjusts a driving force or a braking force at sudden start or sudden acceleration of the vehicle to prevent the wheel slip, an Electronic Stability Program (ESP) that stably adjusts the posture of the vehicle, etc.

Among them, the TCS is an active safety device for preventing excessive slippage of a driving wheel at starting or acceleration of the vehicle on a low friction road or an asymmetric road to prevent a vehicle spin, and improves the starting and acceleration performance of the vehicle, and the steering stability. When an excessive driving force is generated at the starting or acceleration of the vehicle on a slippery road surface and the phenomenon of a wheel slip, etc. is generated, the TCS adjusts the driving wheel speed by adjusting the driving force (e.g., driving torque) or the braking force (e.g., braking torque) of the vehicle, and as a result, the acceleration of the vehicle may be maximized.

Particularly, the driving force of the vehicle may refer to torque output from a vehicle driving source, and the vehicle driving source may be a motor (e.g., pure electric vehicle, fuel cell vehicle), an engine (e.g., internal combustion engine vehicle), or a motor and an engine (e.g., hybrid vehicle). For example, a motor-driven vehicle such as a pure electric vehicle, a fuel cell vehicle, or a hybrid vehicle determines a target driving wheel speed for obtaining an optimum driving force from the driving wheel according to the amount of slip generated between the driving wheel and the road surface, the friction coefficient of the road surface, etc., and adjusts the motor torque to follow the above.

In addition, it may be possible to reduce the motor torque to prevent instability of the vehicle when the vehicle turns at a corner road, thereby allowing the vehicle to turn safely. At operation of the TCS, torque is adjusted to reduce slip by calculating the slip of the vehicle wheel based on the actual vehicle speed while the vehicle is being driven, and it is necessary to determine the actual vehicle speed and the vehicle wheel speed, which are real-time information, to calculate the slip of the vehicle wheel.

For example, the slip rate ($\lambda$) of the vehicle wheel may be calculated as follows.

$$\lambda(\%) = (V_{veh} - V_{whl})/V_{veh} \times 100$$

wherein, the 'Vveh' refers to a vehicle speed, that is, the vehicle body speed, which is a reference speed necessary for calculating the slip rate, and this reference speed has the meaning of the vehicle speed in a state where there is no slip, and is essential information for the TCS operation. The 'Vwhl' refers to a vehicle wheel speed (wheel speed), which is measured by a wheel speed sensor.

As described above, since the reference speed is essential for the TCS operation, accurate estimation of the reference speed is required to achieve proper control performance. It is known to use the speed of a non-driven wheel as a reference speed in a typical vehicle, and a control of limiting the wheel slip using the speed difference between the non-driven wheel speed, which is a reference speed, and the speed of a driving wheel is performed.

Figure 1:
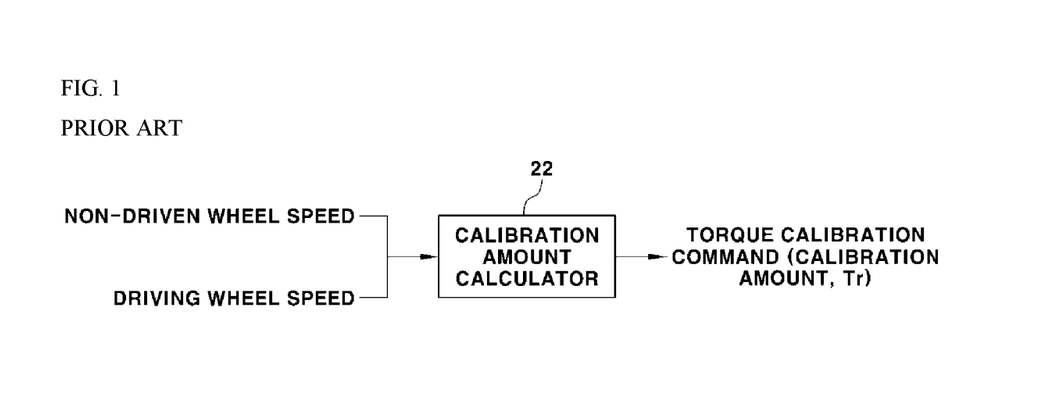
FIG. 1 is a block diagram showing a configuration of calculating a torque calibration command conventionally according to the prior art.

In other words, the difference between the non-driven wheel speed and the driving wheel speed is calculated to calculate the torque calibration amount, that is, the torque calibration command by a function of the speed difference, and a torque command the driving device for driving the vehicle is calibrated using the calculated torque calibration command. FIG. 1 shows that a calibration amount calculator 22 calculates a torque calibration command by receiving the non-driven wheel speed and the driving wheel speed, which are speed information obtained by the detection of a sensor, etc.

However, in an All-Wheel Drive (AWD) vehicle in which all driving forces are transferred to all the vehicle wheels of the vehicle, the speed information of the non-driven wheel is not present, and thus, the non-driven wheel speed may not be used as a reference speed. To limit the wheel slip of the vehicle, reference speed information is inevitable, and accordingly, when the speed information of the non-driven wheel is not present such as with the All-Wheel Drive vehicle, the information corresponding to the reference speed may be only calculated and used with other methods.

For example, global positioning system (GPS) information may be used to obtain actual vehicle speed information as a reference speed and a G sensor configured to detect longitudinal acceleration or an inertial sensor may be used. However, although the information corresponding to the reference speed may be calculated with the above method, there is a drawback in that it is difficult to secure reliability in the calculated information and the control result, resulting in a slow control responsiveness. As a result, there is a limit to slip control performance in a vehicle such as the All-Wheel Drive (AWD) vehicle where it is difficult to calculate a reference speed due to lack of non-driven wheel speed, and accordingly, there is a need for a new paradigm of the driving system torque control methodology for limiting the wheel slip.

The above information disclosed in this section is merely for enhancement of understanding of the background of the disclosure and accordingly it may contain information that does not form the prior art that is already known in this country to a person of ordinary skill in the art.

SUMMARY

Accordingly, the present disclosure provides an improved system and method for controlling a wheel slip, which may limit a wheel slip even in an All-Wheel Drive (AWD) vehicle in which speed information of a non-driven wheel is not present.

In addition, another object of the present disclosure is to provide a system and a method for controlling a wheel slip of a vehicle, which may adjust a wheel slip of a vehicle wheel without using a reference speed even in a general vehicle (Front Wheel Drive (FWD), Rear Wheel Drive (RWD)) as well as an All-Wheel Drive vehicle, and achieve an improved control responsiveness compared to the conventional one.

For achieving the object, according to one aspect of the present disclosure, a system for controlling the wheel slip of the vehicle may include a speed detector configured to detect a speed of a driving device for driving a vehicle, a controller configured to determine a torque calibration command based on a torque command of the driving device, and a current speed and a past speed of the driving device detected by the speed detector, and calibrate the torque command of the driving device using the determined torque calibration command, and a driving device having an operation executed by the calibrated torque command.

In addition, according to another aspect of the present disclosure, a method for controlling a wheel slip of a vehicle may include determining, by a controller, a torque command of a driving device; detecting, by a speed detector, a speed of the driving device for driving a vehicle; determining, by the controller, a torque calibration command based on the determined torque command of the driving device; and a current speed and a past speed of the driving device detected by the speed detector; calibrating, by the controller, the determined torque command of the driving device using the determined torque calibration command; and operating the driving device according to the calibrated torque command.

According to the method for controlling the wheel slip of the vehicle according to the present disclosure, it may be possible to effectively limit the wheel slip even in the All-Wheel Drive (AWD) vehicle in which the speed information of the non-driven wheel is not present. In addition, according to the present disclosure, it may be possible to control the wheel slip without using the reference speed in all vehicles such as Front Wheel Drive (FWD), Rear Wheel Drive (RWD), and All Wheel Drive (AWD), and achieve the improved control responsiveness compared to the conventional one.

BRIEF DESCRIPTION OF THE DRAWINGS

The above and other features of the present disclosure will now be described in detail with reference to exemplary embodiments thereof illustrated the accompanying drawings which are given herein below by way of illustration only, and accordingly are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. The controller may be specifically programmed to execute the processes described herein.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily carry out the present disclosure. However, the present disclosure is not limited to the embodiments described herein and may also be embodied in other forms.

An object of the present disclosure is to provide an improved system and method for controlling a wheel slip, which may limit a wheel slip even in an All-Wheel Drive (AWD) vehicle in which speed information of a non-driven wheel is not present. In addition, another object of the present disclosure is to provide a system and a method for controlling a wheel slip of a vehicle, which may control a wheel slip of a vehicle wheel without using a reference speed even in a general vehicle (FWD vehicle, RWD vehicle) as well as an All-Wheel Drive (AWD) vehicle, and achieve an improved control responsiveness compared to the conventional one.

For this purpose, new types of control system and control method are disclosed which are completely different from the conventional control method using the reference speed in a driving system torque control for limiting a wheel slip of a vehicle. In other words, proposed is a completely new system and a method for controlling a wheel slip that does not require any information regarding the non-driven wheel speed or the reference speed of the vehicle.

The system and method for controlling the wheel slip of the present disclosure is a control method useful for a motor-driven vehicle such as an eco-friendly vehicle, that is, a Battery Electric Vehicle (BEV), a Hybrid Electric Vehicle (HEV), or a Fuel Cell Electric Vehicle (FCEV), using a motor as a vehicle driving source, that is, a driving device for driving a vehicle. In other words, since the system and method for controlling the wheel slip according to the present disclosure should perform a quick torque calibration and the control for a driving device based on the torque (may be a command) of the driving device, and the current speed and the past speed of the driving device, it is useful in a vehicle equipped with a motor having a faster control responsiveness than an engine as the driving device of the vehicle.

In addition, in the present disclosure, the torque calibration may be performed to reduce (e.g., torque downward) the torque (e.g., positive value) at acceleration of the vehicle, and the torque calibration may be performed in the direction of increasing (e.g., torque upward) the torque (e.g., negative value) at deceleration of the vehicle. Particularly, increasing the negative (−) torque at deceleration of the vehicle refers to reducing the absolute value of the torque.

Figure 2:
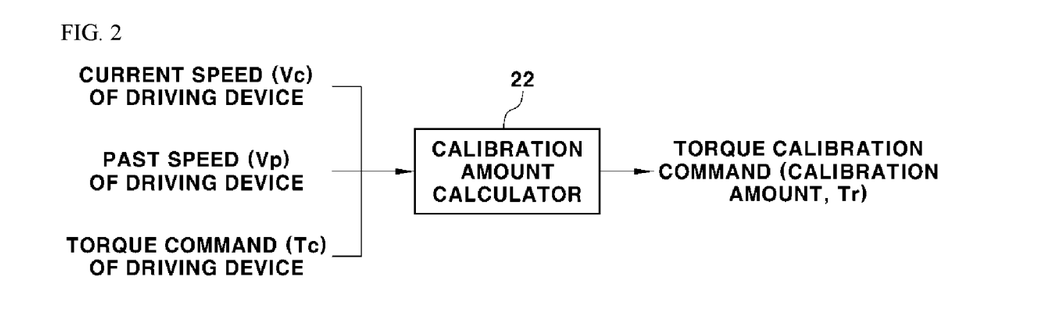
FIG. 2 is a block diagram showing a configuration of a system for controlling a wheel slip according to an exemplary embodiment of the present disclosure.
Figure 3:
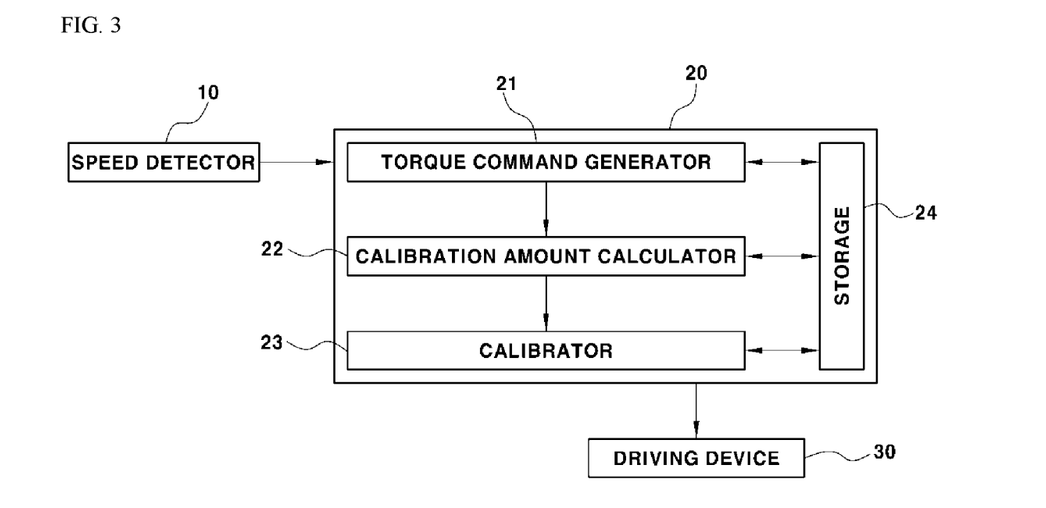
FIG. 3 is a block diagram showing a configuration of calculating a torque calibration command in the system for controlling the wheel slip according to an exemplary embodiment of the present disclosure.

Hereinafter, exemplary embodiments will be described in more detail with reference to the drawings. FIG. 2 is a block diagram showing a configuration of a system for controlling a wheel slip according to the present disclosure, and FIG. 3 is a block diagram showing a configuration of calculating a torque calibration command in the system for controlling the wheel slip according to the present disclosure.

A method for controlling a wheel slip according to the present disclosure has a technical feature of calculating the torque calibration amount (Tr) based on a torque (Tc) of a driving device 30 for driving a vehicle, and a current speed (Vc) and past speed (Vp) information of the driving device. In particular, the torque (Tc) of the driving device refers to a torque command for the driving device, and the torque calibration amount (Tr) refers to a torque calibration command that is a calibration value for the torque command.

As shown in FIG. 2, a system for controlling a wheel slip according to the present disclosure may include a speed detector 10 configured to detect the speed of the driving device 30 for driving a vehicle, a controller 20 configured to determine the torque calibration command (Tr) based on the torque command (Tc) for the driving device 30 and the current speed (Vc) and the pass speed (Vp) of the driving device 30 detected by the speed detector 10 and generate the torque command after calibration by calibrating the torque command (Tc) by the calculated torque calibration command (Tr), and the driving device 30 having an operation adjusted according to the torque command after calibration generated by the controller 20.

In addition, the controller 20 may include a torque command generator 21 configured to generate the torque command (Tc) for the driving device 30, a calibration amount calculator 22 configured to determine the torque command (Tc) generated by the torque command generator 21 and the torque calibration command (Tr) from the current speed (Vc) and the past speed (Vp) of the driving device 30 detected by the speed detector 10, and a calibrator 23 configured to calibrate the torque command (Tc) generated by the torque command generator 21 using the torque calibration command (Tr) determined by the calibration amount calculator 22. In addition, the controller 20 may further include a storage 24 configured to store setting data and speed (e.g., past speed and current speed) information of the driving device, etc. necessary for the control process of the present disclosure.

Referring to FIG. 3, in the present disclosure, the calibration amount calculator 22 may be configured to receive three pieces of input information: the torque command (Tc) for the driving device 30, and the current speed (Vc) and the past speed (Vp) of the driving device 30, and determine and output the torque calibration command (Tr) through a predetermined method and process based on three essential pieces of the input information above.

In the present disclosure, the torque command (Tc) for the driving device refers to a normal torque command obtained by a driver's operating input or cruise mode input to the driving device 30, and the torque calibration in the present disclosure refers to calibrating the torque command. In addition, the driving device 30 may be an engine or a motor as a driving source for driving the vehicle, and the torque command (Tc) may be an engine torque command or a motor torque command.

In addition, both the current speed (Vc) and the past speed (Vp) of the driving device may be measured by the speed detector 10. For example, if the driving device 30 is an engine, the speed detector 10 may include a known engine revolutions per minute (RPM) sensor configured to detect an engine speed, and if the driving device 30 is a motor, the speed detector may include a known resolver. When the current speed (Vc) is the speed of the driving device 30 detected at the current control time point, the past speed (Vp) may be the speed of the previous control period stored in the controller 20.

In other words, when the real-time speed information of the driving device 30 detected by the speed detector 10 is input to the controller 20 at a certain control period, the input speed of the driving device 30 may be stored in the storage 24 in the controller 20 at every control period, and the speed of the previous control period stored in the storage 24 at the current control time point may be used as the past speed (Vp) distinguished from the current speed (Vc). In addition, in the present disclosure, the controller 20 may be a controller configured to execute a known TCS control or a wheel slip control, and the controller may be a single controller or a plurality of controllers for a cooperative control.

In an example of FIG. 3, all of the torque command generator 21, the calibration amount calculator 22, and the calibrator 23 constituting one controller may also be individual controllers. In other words, in the present disclosure, a process of determining the torque calibration command (Tr) based on the torque information (Tc) and the speed information (Vc, Vp) of the driving device 30, and a process of calibrating the torque command (Tc) may also be performed by a separate controller distinguished from a controller (that is, a hybrid controller or a vehicle controller that is an upper controller) configured to generate the torque command (Tc) for the driving device 30.

In addition, in the present disclosure, the controller 20 may be a controller including both a vehicle controller, which is an upper controller, and an engine controller or a motor controller, which is a lower controller, which perform a cooperative control in a vehicle. Alternatively, in the present disclosure, the controller 20 for adjusting a wheel slip, in cooperation with a separate engine or motor controller, may be configured to operate the driving device 30, which may be the engine or the motor.

In both cases, the engine controller and the motor controller may be configured to operate the engine or the motor according to the torque command calibrated by the calibrator 23, that is, the torque command after calibration. In the figure, 'Tc' refers to the torque command (e.g., a motor torque command) for the driving device 30; 'Vc' refers to the current speed of the driving device; 'Vp' refers to the past speed of the driving device; and 'Tr' refers to the torque calibration command.

In the present disclosure, all the essential input information for calculating the torque command (T) is the information within the range relevant to the driving device, that is, obtained directly from the driving device; any information which is not directly related to the driving device is not necessary. Further, the torque command generator 21 in the controller 20 (or may be a vehicle controller or a hybrid controller as a separate controller) may be configured to determine and generate a primary torque command (e.g., torque command before calibration) required during operation of the vehicle according to the driver's operating input or cruise mode input in a general method. In addition, the torque command before calibration (Tc) generated by the torque command generator 21 may be input to the calibration amount calculator 22 of FIG. 3 as information for calculating the torque calibration command (Tr).

Next, FIGS. 4 to 8 are diagrams showing various exemplary embodiments with different methods and processes for determining the torque calibration command (Tr) in the system for controlling the wheel slip according to the present disclosure. As shown in FIGS. 4 to 8, the essential input information for determining the torque calibration command (Tr) is the torque command (Tc), the current speed (Vc), and the past speed (Vp) of the driving device.

Figure 4:
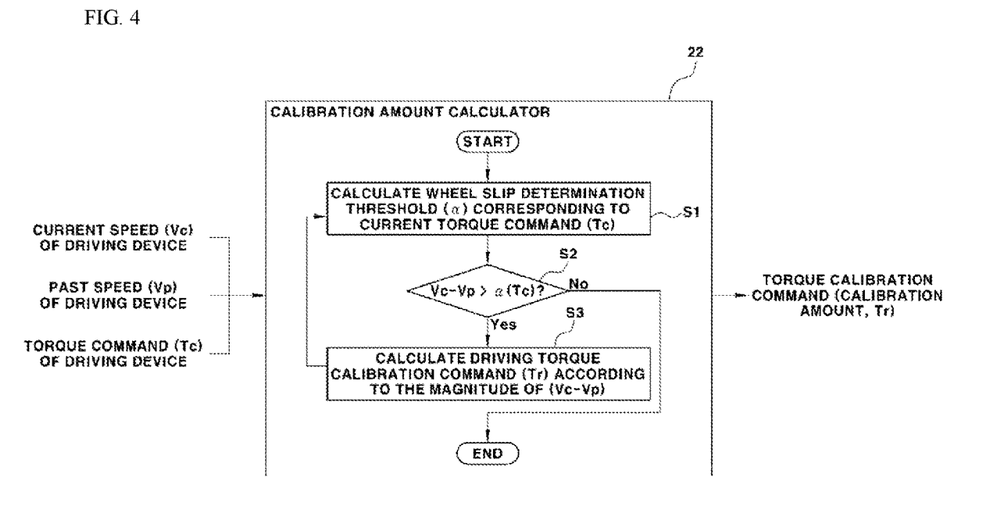
FIGS. 4 through 8 are diagrams showing various embodiments with different methods and processes for determining the torque calibration command in the system for controlling the wheel slip according to an exemplary embodiment of the present disclosure.

First, in an exemplary embodiment shown in FIG. 4, the calibration amount calculator 22 of the controller 20 may be configured to determine a wheel slip determination threshold ($\alpha$) that corresponds to the current torque command (Tc) for the driving device using the setting data previously input and stored in the storage (denoted by reference numeral '24' in FIG. 3) (operation S1). In particular, the setting data may be data which has previously defined the relationship between the torque command (Tc) and the wheel slip determination threshold ($\alpha$), and may be the table, a line diagram, etc. capable of determining a value of the wheel slip determination threshold ($\alpha$) from the torque command (Tc).

In the setting data, the wheel slip determination threshold ($\alpha$) may be set by a function of the torque command (Tc), and the larger the torque command (Tc) is, the larger the value of the wheel slip determination threshold ($\alpha$) may be set. As another example, the wheel slip determination threshold ($\alpha$), together with the torque command (Tc) of the driving device 30 in the setting data, may be set by one or two functions among the speed and the road gradient of the traveling road, which is additional information detected or collected from the vehicle.

In summary, in the setting data, the wheel slip determination threshold ($\alpha$) may be set by the function of the torque command (Tc) and the speed, or the function of the torque command (Tc) and the road gradient, or the function of the torque command (Tc), the speed, and the road gradient. The speed may be a vehicle speed obtained using a sensor, etc., or the rotational speed of a driving system.

The rotational speed of the driving system may be the speed of a driving wheel detected by a wheel speed sensor not shown, may be the rotational speed of the driving device, or may be the rotational speed of a transmission input shaft or the rotational speed of a transmission output shaft. In particular, the rotational speed of the driving device may be an engine speed or a motor speed. Alternatively, the rotational speed of the driving system may also be a rotational speed of an Integrated Starter and Generator (ISG), which is a starter generator connected to an engine, and may be used as the rotational speed of the driving system when it is the rotational speed related to the driving wheel speed in the present disclosure.

In addition, the road gradient may be sensor detection information by a longitudinal acceleration sensor, etc. in the vehicle, or may be information obtained from map information of a navigation device, or obtained by communication with the outside of the vehicle. Even in this case, in the setting data, when the other variable for determining the wheel slip determination threshold ($\alpha$) is the same condition, the larger the value of the torque command (Tc) is, the larger the value of the threshold ($\alpha$) may be set (e.g., the smaller the value of the torque command is, the smaller the value of the threshold is set).

In the setting of the data, when the other variables for determining the wheel slip determination threshold ($\alpha$) including the torque command (Tc) is in the same condition; the larger the vehicle speed (or rotational speed of the driving system) is and the larger the road gradient is, the wheel slip determination threshold ($\alpha$) may be set to a smaller value. As described above, once the wheel slip determination threshold ($\alpha$) has been determined, the calibration amount calculator 22 may be configured to calculate the speed difference (Vc−Vp) between the current speed (Vc) and the past speed (Vp) of the driving device, and compares the speed difference (Vc−Vp) with the wheel slip determination threshold ($\alpha$) (operation S2).

Particularly, when the speed difference (Vc−Vp) is greater than the wheel slip determination threshold (α), the calibration amount calculator 22 may be configured to determine that the wheel slip of the driving wheel has been generated, and then, the calibration amount calculator 22 may be configured to determine the torque calibration command (e.g., torque calibration amount) (Tr) of the value corresponding to the speed difference (Vc−Vp) using the setting data previously input and stored in 24 (operation S3). The setting data may be data that has previously defined the relationship between the speed difference (Vc−Vp) and the torque calibration command (Tr), and may be a table, a map, a line diagram, etc. capable of determining the value of the torque calibration command (Tr) from the speed difference (Vc−Vp), or may be a formula.

Figure 5:
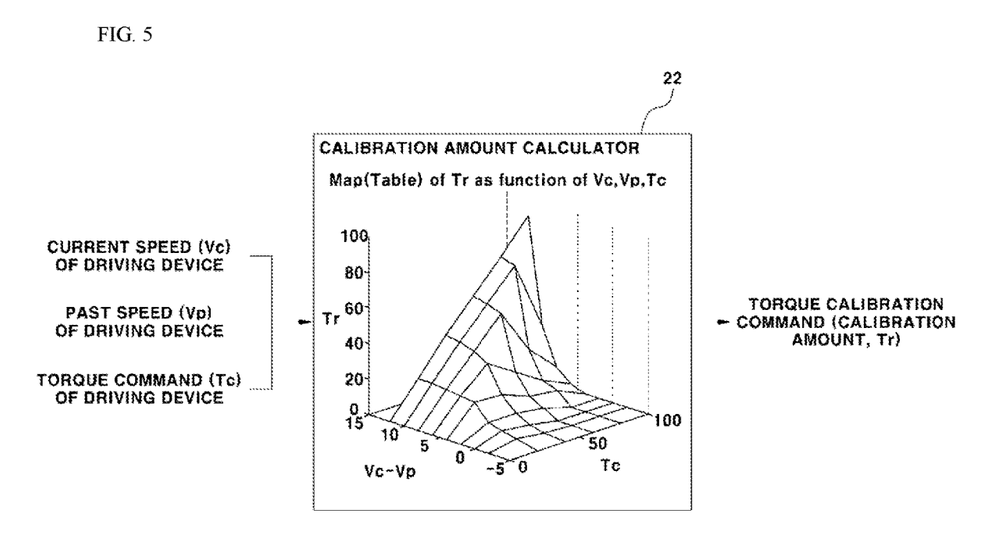

Further, FIG. 5 is a diagram showing an exemplary embodiment that determines the torque calibration command (Tr) from the map (or table), which is the setting data, using the torque command (Tc) for the driving device 30, and the current speed (Vc) and the past speed (Vp) of the driving device, which are the variable input information, in the calibration amount calculator 22. Specifically, the calibration amount calculator 22 may be configured to determine the torque calibration command (Tr) from the map using the torque command (Tc) for the driving device 30, and the speed difference (Vc−Vp) between the current speed (Vc) and the past speed (Vp) of the driving device, and at this time, the torque calibration command (Tr) is previously set in the map as the value according to the torque command (Tc) and the speed difference (Vc−Vp).

At this time, the setting data stored in the storage 24 may include a threshold curve following a predetermined point on the plane formed by the (Vc−Vp) axis and the Tc axis set in the map, and the torque calibration command (Tr), which is the torque calibration reduction amount (torque calibration amount) may be set to zero or a value closer to zero in the area where the speed difference (Vc−Vp) between the current speed (Vc) and the past speed (Vp), which are input information, is the (Vc−Vp) value or less of the threshold curve.

On the other hand, in the area where the speed difference (Vc−Vp) between the current speed (Vc) and the past speed (Vp), which are input information, is greater than the (Vc−Vp) value of the threshold curve, the torque calibration command (Tr) may be set to be greater than that in the area where it is the (Vc−Vp) value or less of the threshold curve. In addition, as may be seen in FIG. 5, the larger the speed difference (Vc−Vp) is, the larger the torque calibration command (Tr) may be set in the map.

In addition, the past speed (Vp) of the driving device 30 may be a rotational speed of the driving device 30 that corresponds to a plurality of predetermined past time points, that is, a plurality of previous control periods, and at this time, the speed difference between the current speed (Vc) and the past speeds (Vp1, Vp2, Vp3, . . . ) at each time point of the driving device 30 may be obtained. In other words, since the past time point is plural, the past speeds (Vp1, Vp2, Vp3, . . . ) of the driving device 30 may also be obtained in the plural, and when the real-time speed information of the driving device 30 detected by the speed detector 10 is input to the controller 20 every predetermined control period, the input speed information may be stored in the storage 24 in the controller 20 to be later used as the past speed, and then each time the speed difference is obtained, the speed difference ((Vc−Vp1), (Vc−Vp2), (Vc−Vp3), . . . ) with the current speed (Vc) for each predetermined number of past speeds (Vp1, Vp2, Vp3, . . . ) stored in the storage 24 may be calculated.

Particularly, the plurality of past time points may be time points of the previous control period or time points, a predetermined time from the present, for example, about 10 msec, 50 msec, 100 msec, etc., before the present. Subsequently, the calibration amount calculator 22 may be configured to determine a plurality of torque calibration commands (Tr) using the respective maps, respectively, from the predetermined number of the speed difference ((Vc−Vp1), (Vc−Vp2), (Vc−Vp3), . . . ) calculated from the plurality of past speeds (Vp1, Vp2, Vp3, . . . ) and the current speed (Vc), and the torque command (Tr) determined by the torque command generator 21, and then select one of the determined plurality of torque calibration commands.

At this time, the calibration amount calculator 22 may be configured to determine the maximum value or the minimum value among the determined plurality of torque calibration commands as a final torque calibration command, or determine the average value obtained by averaging the determined plurality of torque calibration commands as the final torque calibration command. Alternatively, the calibration amount calculator 22 may be configured to finally determine a value that sums all of the plurality of the torque calibration commands as the torque calibration command, or determine the value that sums them by applying a weight to the plurality of torque calibration commands, respectively, as the final torque calibration command.

In addition, in determining the torque calibration command (torque calibration amount) (Tr) in the method using the map, the vehicle speed or the road gradient, or the vehicle speed and the road gradient may be further used. For example, after storing the individual maps as setting data in the controller 20 (storage) for each of a multistage vehicle speed section, a road gradient section, or a multistage vehicle speed section and road gradient section, the calibration amount calculator 22 may be configured to determine the torque calibration command (Tr) that corresponds to the torque command (Tc) of the driving device 30 and the speed difference (Vc−Vp) between the current speed (Vc) and the past speed (Vp) of the driving device using the map corresponding to the current vehicle speed, the road gradient, or the current vehicle speed and the road gradient.

Even in this case, it may be possible to use the plurality of past speeds (Vp1, Vp2, Vp3, . . . ) rather than one past speed, and for each of the vehicle speed section, the road gradient section, or the vehicle speed section and the road gradient section, a plurality of maps further sub-divided for each past time point may be used instead of one map.

As described above, when using the plurality of maps, the final torque calibration command (Tr) may be calculated in the method for summing all the plurality of torque calibration commands obtained through each individual map or by summing them with a weight, etc.; or one torque calibration command (Tr) may be selected with a predetermined method (e.g., a minimum value or a maximum value) among the plurality of torque calibration commands obtained through the individual map; or the final torque calibration command (Tr) may be determined by the average value of the plurality of torque calibration commands.

Figure 6:
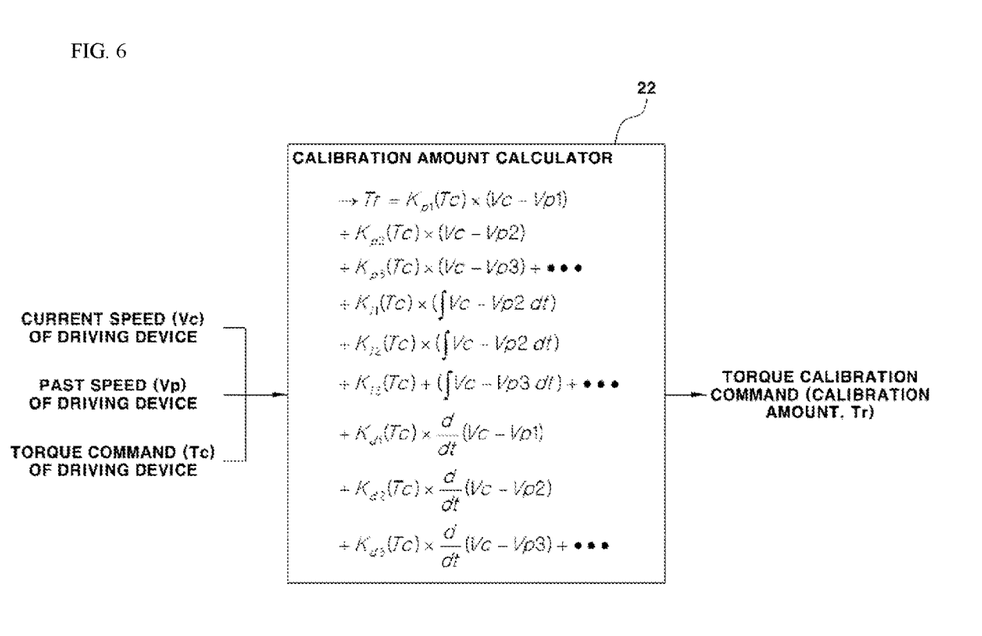

Further, FIG. 6 is a diagram showing an exemplary embodiment that calculates the torque calibration command (Tr) using the empirical formula that is the setting data in the calibration amount calculator 22. As shown in FIG. 6, when the torque command of the driving device 30, and the current speed (Vc) and the past speed (Vp) of the driving device are input to the calibration amount calculator 22, the calibration amount calculator may be configured to calculate the torque calibration command according to a predetermined formula using this input information.

Referring to the formula of FIG. 6, a p gain ($K_p$), an i gain ($K_i$), and a d gain ($K_d$), which are control gains in the formula, may be used, and the past speeds (Vp1, Vp2, Vp3, . . . ) of the driving device 30 detected at a plurality of past time points may be used. Briefly explaining the formula, the torque calibration command may be obtained by multiplying the speed difference ((Vc−Vp1), (Vc−Vp2), (Vc−Vp3)) between the current speed (Vc) and each of the individual past speeds (Vp1, Vp2, Vp3, . . . ) of the driving device 30 by the p gain, respectively; multiplying the integral term and the derivative term for the time (t) of each of the speed difference ((Vc−Vp1), (Vc−Vp2), (Vc−Vp3)) by the i gain and the p gain, respectively, and summing all the multiplied values.

At this time, each gain may be determined by a function of the torque command (Tc) of the driving device, and at this time, the setting data, in which the gain values ($Kp_1$, $Kp_2$, $Kp_3$, . . . , $Ki_1$, $Ki_2$, $Ki_3$, . . . , $Kd_1$, $Kd_2$, $Kd_3$) between a predetermined value and zero have been set according to the value of the torque command (Tc), may be used. In addition, the past time points are all either the time points of the previous control period or the predetermined time points before the present, and for example, the $Vp_1$ may be set to the speed about 10 msec before the present; the $Vp_2$ may be set to the speed about 50 msec before the present; and the $Vp_3$ may be set to the speed about 100 msec before the present, etc.

In addition, similarly to the wheel slip determination threshold (α) of an exemplary embodiment shown in FIG. 4, each gain may also be set by a function of the torque command (Tc) of the driving device 30 and either or both of the speed and the road gradient detected or gathered as additional information in a vehicle, all of which are data stored in the storage 24 of the controller 20. In summary, with the setting data, each gain may be set by a function of the torque command (Tc) and the speed; by a function of the torque command (Tc) and the road gradient; or a function of the torque command (Tc), the speed, and the road gradient.

Particularly, the speed used to determine the control gain may be a vehicle speed obtained using a sensor, etc. or the rotational speed of the driving system. The rotational speed of the driving system may be the driving wheel speed detected by the wheel speed sensor, the rotational speed of the driving device, the rotational speed of the transmission input shaft, or the rotational speed of the transmission output shaft. The rotational speed of the driving device may be an engine speed or a motor speed.

Alternatively, the rotational speed of the driving system may also be the rotational speed of the ISG, and may be used as the rotational speed of the driving system when it is the rotational speed related to the driving wheel speed in the present disclosure. The road gradient may be sensor detection information obtained by a longitudinal acceleration sensor or the like in the vehicle, or may be information obtained from map information of the navigation device or by communication with the outside of the vehicle.

Figure 7:
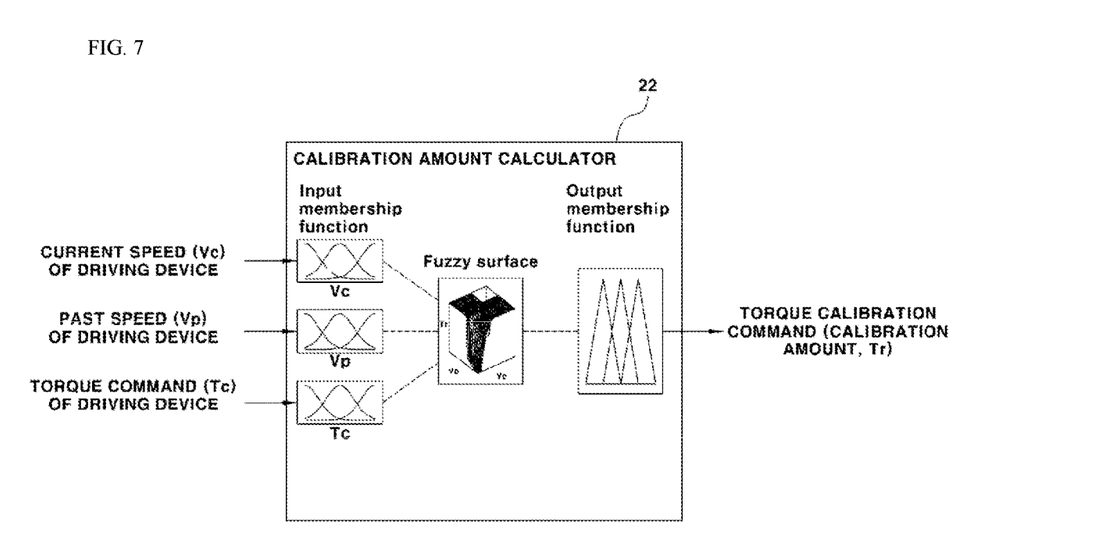

Furthermore, FIG. 7 is a diagram showing an exemplary embodiment that determines the torque calibration command (Tr) based on fuzzy logic with the torque command (Tc) of the driving device, and the current speed (Vc) and the past speed (Vp) of the driving device in the calibration amount calculator 22. The fuzzy logic used in the embodiment of FIG. 7 may be set to simulate the map based method of FIG. 5 using the map as a whole.

Figure 8:
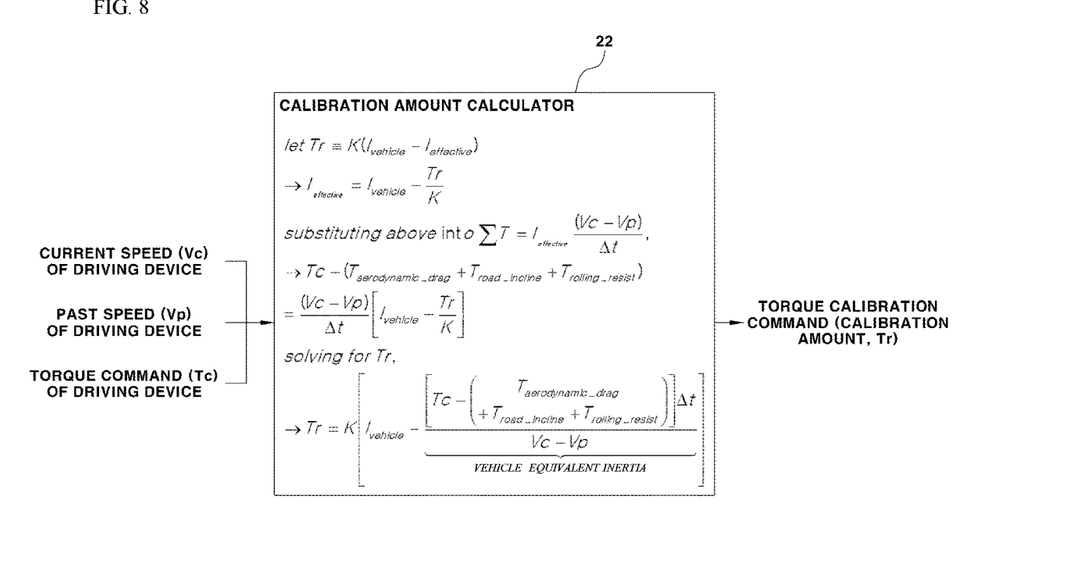

Meanwhile, FIG. 8 is a diagram showing an exemplary embodiment that determines the torque calibration command (Tr) based on a physical model formula from the input information (Tc, Vc, Vp) in the calibration amount calculator 22. At this time, the model formula may be the one set by the controller 20 to calculate the torque calibration command (Tr) with the control gain, the rotational inertia of the vehicle previously determined as a constant, and the equivalent inertia (variable) of the vehicle determined based on the input information.

The physical model formula shown in FIG. 8 will be described as follows. First, the torque calibration command (Tr) may be expressed as in the following Equation 1.

$$Tr = K(I_{vehicle} - I_{effective}) \quad \text{Equation 1}$$

wherein, the 'K' refers to the control gain, the '$I_{vehicle}$' refers to the rotational inertia of the vehicle (constant), and the '$I_{effective}$' refers to the equivalent inertia of the vehicle (variable).

At this time, the equivalent inertia of the vehicle ($I_{effective}$) may be expressed by the following Equation 2 from the Equation 1.

$$I_{effective} = I_{vehicle} - \frac{Tr}{K} \quad \text{Equation 2}$$

In addition, the sum of torques may be expressed by the following Equation 3.

$$\sum T = I_{effective} \frac{(Vc - Vp)}{\Delta t} \quad \text{Equation 3}$$

wherein, the t refers to the time, and the Δt refers to the time between present and past time points at which the current speed (Vc) and the past speed (Vp) have been detected, respectively.

In the Equation 3, the sum of torques may be defined as '$\sum T = Tc - (T_{aerodynamic\_drag} + T_{road\_incline} + T_{rolling\_resist})$', and at this time, Equation 4 may be obtained by substituting the '$I_{effective}$' of the Equation 3 with the Equation 2.

$$Tc - (T_{aerodynamic\_drag} + T_{road\_incline} + T_{rolling\_resist}) = \frac{(Vc - Vp)}{\Delta t}\left[I_{vehicle} - \frac{Tr}{K}\right] \quad \text{Equation 4}$$

In Equation 4, the $T_{aerodynamic\_drag}$ refers to an aerodynamic torque for the traveling vehicle, the $T_{road\_incline}$ refers to a gradient resistance torque, and the $T_{rolling\_resist}$ refers to a rolling resistance torque. As a result, the following Equation 5 may be derived from the Equation 4, and the torque calibration command (Tr) may be calculated by Equation 5.

$$Tr = K\left[I_{vehicle} - \frac{\left[Tc - \left(\begin{array}{c}T_{aerodynamic\_drag} + \\ T_{road\_incline} + T_{rolling\_resist}\end{array}\right)\right]\Delta t}{Vc - Vp}\right] \quad \text{Equation 5}$$

In the Equation 5, $$\frac{\left[T_c - \left(\begin{array}{c}T_{aerodynamic\_drag} + \\ T_{road\_incline} + T_{rolling\_resist}\end{array}\right)\right]\Delta t}{V_c - V_p},$$

corresponds to the equivalent inertia of the vehicle ($I_{effective}$), and the equivalent inertia of the vehicle may also be replaced with one obtained by other methods such as an observer, etc. instead of the above formula.

In addition, in Equation 5, the air resistance torque ($T_{aerodynamic\_drag}$), the gradient resistance torque ($T_{road\_incline}$), and the rolling resistance torque ($T_{rolling\_resist}$) may be selectively used as necessary.

As described above, the method and the process for determining the torque calibration command in the system for controlling the wheel slip according to the present disclosure have been described, and as described above, the present disclosure may determine the torque calibration command (Tr) by using the information of the primary torque command (Tc), the current speed (Vc), and the past speed (Vp) of the driving device; calibrates the primary torque command (Tc) of the driving device by using the determined torque calibration command (Tr); and then operate the driving device 30 using the calibrated final torque command.

The present disclosure may use the measured value that has passed through a predetermined signal preprocessing process as the current speed (Vc) and the past speed (Vp) of the driving device 30. In addition, in the present disclosure, the time point difference between the current speed (Vc) and the past speed (Vp) of the driving device is adjustable, and for example, the time point at which the past speed (Vp) was measured may be the time point before one period or two periods from the present among the previous control periods, the time point before a predetermined period of others.

In addition, the past speed (Vp) of the driving device may be the past speed of the selected period of the previous control period, and in the present disclosure, the time point difference (time) between the current speed (Vc) and the past speed (Vp) may also be set to a specific amount of time. As described above, the speeds of the driving device at a plurality of the past time points, that is, the values of a plurality of past speeds (Vp1, Vp2, Vp3, . . . ) may also be used.

Further, a post-calibration processing for the calculated torque calibration command (Tr) may also be performed using a rate limiter, a filter, etc., and may also apply the method that simultaneously uses a plurality of methods selected from the control methods for limiting the wheel slip shown in FIGS. 4 to 8. For example, the final torque calibration command (Tr) may be calculated in the method for summing the torque calibration commands obtained, respectively, through at least two methods among the methods of FIGS. 4 to 8, and then the torque command (Tc) of the driving device may be calibrated using the calculated find torque calibration command (Tr).

In addition, although the control method of the present disclosure has been described based on the fact that the acceleration direction of the vehicle, that is, the driving torque is a positive (+) value, the control method of the present disclosure is equally applicable to the deceleration direction of the vehicle as well. However, in the torque command (Tc), the wheel slip determination threshold ($\alpha$), the speed difference (Vc–Vp), the torque calibration command (Tr), etc., the negative and positive values indicating directionality should be considered separately.

At acceleration of the vehicle, the driving torque, a torque command (Tc) thereof, and the wheel slip determination threshold ($\alpha$) may be positive values, and the torque calibration at wheel slip may be a calibration that reduces the positive driving torque. In other words, when the torque calibration command is defined as a positive (+) value, it may be regarded as the calibration that subtracts the torque calibration command from the positive (+) driving torque at acceleration of the vehicle.

On the other hand, at deceleration, the driving torque, a torque command (Tc) thereof, and the wheel slip determination threshold ($\alpha$) may be negative (–) values, and the torque calibration at wheel slip may be the calibration that increases the negative (–) driving torque (regenerative torque) to get closer to zero. In other words, at deceleration of the vehicle, the torque calibration may be performed to reduce the drive torque closer to zero based on the absolute value. When the torque calibration command is defined as a positive (+) value, it may be the calibration that adds the negative (–) driving torque (regenerative torque) to the torque calibration command.

Explaining an example based on the acceleration direction, the wheel slip determination threshold ($\alpha$) may be set by the function of the torque command (Tc) of the drive, and at this time, the larger the magnitude of the torque command (Tc) is, the larger the value of the wheel slip determination threshold ($\alpha$) corresponding to the torque command (Tc) may be set. In addition, the wheel slip determination threshold ($\alpha$) may be set by a function of the torque command (Tc) and the vehicle speed or the road gradient, or a function of the torque command (Tc) and the vehicle speed and the road gradient, and when the other variables are the same, the larger the vehicle speed is (e.g., 0→100), or the larger the road gradient is (e.g., 10% downhill→horizontal→10% uphill), the smaller the wheel slip determination threshold ($\alpha$) may be set (e.g. 10→0).

In addition, the larger the magnitude of the speed difference (Vc–Vp) between the current speed (Vc) and the past speed (Vp) of the driving device is (e.g., 0→10), the larger the torque calibration command (torque calibration amount) (Tr) for reducing the driving torque may be set (e.g., 0→100).

Furthermore, explaining an example based on the deceleration direction, the wheel slip determination threshold ($\alpha$) may be set by the function of the torque command (Tc) of the driving device, and at this time, the smaller the magnitude of the torque command (Tc) that is a negative (–) value is (e.g., the larger the magnitude of the absolute value of the torque command is) (e.g., 0→–100), the smaller the value of the wheel slip determination threshold ($\alpha$) may be set (e.g., 0→–10).

In addition, the wheel slip determination threshold ($\alpha$) may be set by the function of the vehicle speed (or rotational speed of the driving system) or the road gradient, which is additional information, together with the torque command (Tc), or the vehicle speed and the road gradient, which are additional information, together with the torque command (Tc), and when the remaining variable values are the same, the larger the vehicle speed is (e.g., 0→100), or the larger the road gradient is (e.g., 10% downhill→horizontal→10% uphill), the smaller the wheel slip determination threshold ($\alpha$) may be set (e.g. 0→–10).

The smaller the magnitude of the speed difference (Vc–Vp) between the current speed (Vc) and the past speed (Vp) of the driving device is (e.g., 0→–10), the larger the torque calibration value (torque calibration amount) (Tr) for increasing the negative (−) driving torque (e.g., for reducing the regenerative torque based on the absolute value) may be set.

Figure 9:
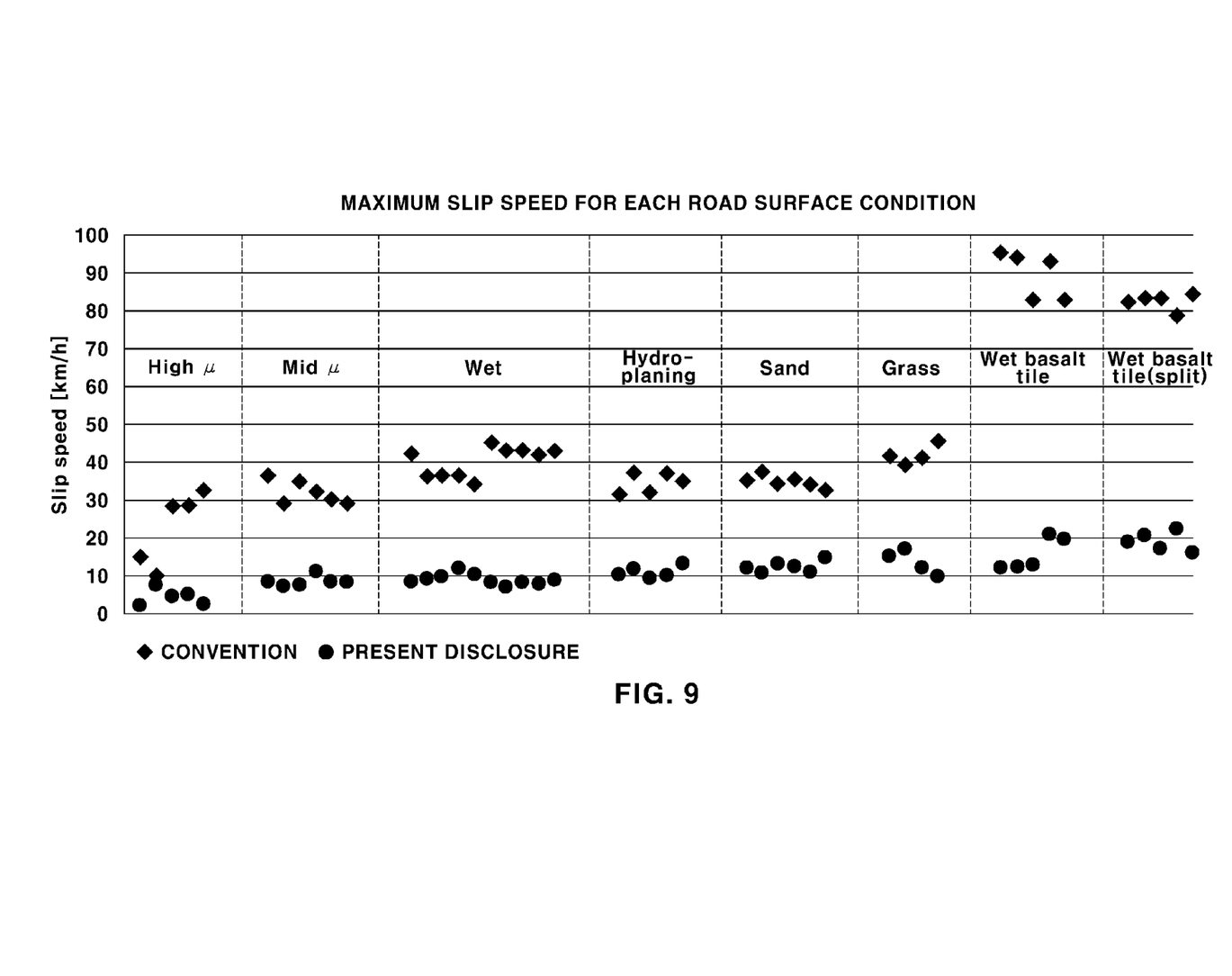
FIG. 9 is a diagram showing a comparison of the wheel slip limit effect for each road condition between the conventional control method and the control method an exemplary embodiment of the present disclosure.

Meanwhile, FIG. 9 is a diagram showing a comparison of the wheel slip limit effect for each road condition for the conventional control method and the control method of the present disclosure. As may be seen in FIG. 9, as a result of the actual vehicle application test, it was confirmed that in the present disclosure, the peak wheel slip on all road surfaces was reduced by about 60 to 80% compared to the conventional application, showing that there was improved wheel slit limit effect in the present disclosure.

In addition, it was confirmed that in terms of performance, the present disclosure may use the maximum available torque at all times (e.g., 365→395 Nm), and also improve the acceleration performance by up to 20% compared to the conventional application. It was further confirmed that it was possible to achieve the jolt feeling reduction effect and the uninterrupted feeling of acceleration in terms of driving performance (e.g., G-value vibration width of the vehicle is reduced from 4.04 m/s$^2$ to 1.36 m/s$^2$), and even in terms of fuel economy, it was confirmed that power consumption during starting was improved by about 20% in the present disclosure.

The present disclosure confirmed the repeatability and reproducibility of the above results through repeated tests, and an improved wheel slip limit effect was realized compared to the conventional application through the repeated actual vehicle applying test when applying the method for controlling the wheel slip of the present disclosure.

As described above, although the exemplary embodiments of the present disclosure have been described in detail, the claims of the present disclosure are not limited to the above-described embodiments, and various modifications and improvements by those skilled in the art using the basic concept of the present disclosure defined in the appended claims may also be included the claims of the present disclosure.

What is claimed is:

1. A system for controlling a wheel slip of a vehicle, comprising:
a speed detector configured to detect a speed of a driving device for operating the vehicle;
a controller configured to determine a torque calibration command based on a torque command of the driving device, and a current speed and a past speed of the driving device detected by the speed detector, and calibrate the torque command of the driving device using the determined torque calibration command; and
a driving device having an operation adjusted by the calibrated torque command,
wherein the controller includes:
a torque command generator configured to determine the torque command of the driving device;
a calibration amount calculator configured to determine the torque calibration command based on the torque command determined by the torque command generator, and the current speed and the past speed of the driving device detected by the speed detector; and
a calibrator configured to calibrate the torque command determined by the torque command generator using the torque calibration command determined by the calibration amount calculator.

2. The system for controlling the wheel slip of the vehicle of claim 1, wherein the controller is configured to:
determine a wheel slip determination threshold based on the torque command of the driving device;
determine the torque calibration command that corresponds to a speed difference by determining that a wheel slip has been generated in a driving wheel of the vehicle when the speed difference between the current speed and the past speed of the driving device is greater than the wheel slip determination threshold; and
calibrate the torque command of the driving device using the determined torque calibration command.

3. The system for controlling the wheel slip of the vehicle of claim 2, wherein in the controller, the larger a value of the torque command of the driving device is, the larger a value of the wheel slip determination threshold is set.

4. The system for controlling the wheel slip of the vehicle of claim 2, wherein the wheel slip determination threshold is determined by the torque command of the driving device, and a value that corresponds to one or two among a vehicle speed or a rotational speed of a driving system of the vehicle and a road gradient of the traveling road, which are information detected or collected by the vehicle.

5. The system for controlling the wheel slip of the vehicle of claim 4, wherein the wheel slip determination threshold is set to a larger value, as the value of the torque command is larger, is set to a smaller value as the vehicle speed or the rotational speed of the driving system is larger, and is set to a smaller value as the road gradient increases.

6. The system for controlling the wheel slip of the vehicle of claim 1, wherein the controller is configured to determine the torque calibration command from a map by using the torque command of the driving device, and the current speed and the past speed of the driving device.

7. The system for controlling the wheel slip of the vehicle of claim 6, wherein the controller is configured to:
determine a speed difference between the current speed and the past speed of the driving device; and
determine the torque calibration command that corresponds to the torque command of the driving device and the speed difference from the map.

8. The system for controlling the wheel slip of the vehicle of claim 7, wherein in the map, the larger the speed difference between the current speed and the past speed of the driving device is, the larger the value of the torque calibration command is set.

9. The system for controlling the wheel slip of the vehicle of claim 6, wherein the controller is configured to determine the torque calibration command from the map by using either or both of a vehicle speed and a road gradient of the traveling road, which are information detected or collected by the vehicle.

10. The system for controlling the wheel slip of the vehicle of claim 1, wherein the controller is configured to calculate the torque calibration command using a predetermined formula or fuzzy logic from the torque command of the driving device, the current speed and the past speed of the driving device.

11. The system for controlling the wheel slip of the vehicle of claim 10, wherein the formula is a predetermined formula to calculate the torque calibration command using a control gain determined based on the torque command of the driving device, and the speed difference between the current speed and the past speed of the driving device.

12. The system for controlling the wheel slip of the vehicle of claim 10, wherein the formula is a predetermined formula to calculate the torque calibration command using a control gain, a rotational inertia of the vehicle, which is a constant previously defined, and an equivalent inertia of the vehicle, which is a variable, in the controller, and wherein the equivalent inertia of the vehicle in the formula is calculated using the torque command of the driving device, and the speed difference between the current speed and the past speed of the driving device.

13. A method for controlling a wheel slip of a vehicle, comprising:
   determining, by a torque command generator of a controller, a torque command of a driving device;
   detecting, by a speed detector, a speed of the driving device for operation the vehicle;
   determining, by a calibration amount calculator of the controller, a torque calibration command based on the determined torque command of the driving device, and a current speed and a past speed of the driving device detected by the speed detector;
   calibrating, by a calibrator of the controller, the determined torque command of the driving device using the determined torque calibration command; and
   operating the driving device according to the calibrated torque command.

14. The method for controlling the wheel slip of the vehicle of claim 13, further comprising:
   determining, by the controller, a wheel slip determination threshold based on the torque command of the driving device;
   determining, by the controller, the torque calibration command that corresponds to a difference between the current speed and the past speed of the driving device when a wheel slip is generated, which is determined if the difference is greater than the wheel slip determination threshold, and
   calibrating, by the controller, the torque command of the driving device using the determined torque calibration command.

15. The method for controlling the wheel slip of the vehicle of claim 14, wherein the wheel slip determination threshold is determined by the torque command of the driving device, and a value that corresponds to either or both of a vehicle speed or a rotational speed of a driving system of the vehicle and a road gradient of the traveling road, which are information detected or collected by the vehicle.

16. The method for controlling the wheel slip of the vehicle of claim 13, further comprising: determining, by the controller, the torque calibration command from a map using the torque command of the driving device, and the current speed and the past speed of the driving device.

17. The method for controlling the wheel slip of the vehicle of claim 16, further comprising: determining, by the controller, the torque calibration command from the map using either or both of a vehicle speed and a road gradient of the traveling road, which are information detected or collected by the vehicle.

18. The method for controlling the wheel slip of the vehicle of claim 13, further comprising: calculating, by the controller, the torque calibration command using a predetermined formula or fuzzy logic from the torque command of the driving device, and the current speed and the past speed of the driving device, and wherein the formula is a predetermined formula to calculate the torque calibration command using a control gain determined based on the torque command of the driving device, and the speed difference between the current speed and the past speed of the driving device.

19. The method for controlling the wheel slip of the vehicle of claim 13, further comprising: calculating, by the controller, the torque calibration command using a predetermined formula or fuzzy logic from the torque command of the driving device, and the current speed and the past speed of the driving device, wherein the formula is a predetermined formula to calculate the torque calibration command using a control gain, a rotational inertia of the vehicle, which is a constant previously defined, and an equivalent inertia of the vehicle, which is a variable, in the controller, and wherein the equivalent inertia of the vehicle in the formula is calculated using the torque command of the driving device, and the speed difference between the current speed and the past speed of the driving device.

* * * * *